United States Patent
Nagata et al.

[11] Patent Number: 5,656,251
[45] Date of Patent: Aug. 12, 1997

[54] METHOD OF SULFUR PURIFICATION

[75] Inventors: Hideki Nagata; Shuji Kuramochi; Norihito Ishimori, all of Akita, Japan

[73] Assignee: Akita Zinc Col., Ltd., Tokyo, Japan

[21] Appl. No.: 314,937

[22] Filed: Sep. 29, 1994

Related U.S. Application Data

[63] Continuation-in-part of Ser. No. 27,278, Mar. 5, 1993, abandoned.

[30] Foreign Application Priority Data

Dec. 2, 1992 [JP] Japan .................... 4-356198

[51] Int. Cl.⁶ .................... C01B 17/02
[52] U.S. Cl. .................... 423/578.1; 423/567.1
[58] Field of Search .................... 423/578.1, 567.1, 423/511, 110, 578.2; 502/415, 516; 23/293 S

[56] References Cited

U.S. PATENT DOCUMENTS

| | | | |
|---|---|---|---|
| 2,947,614 | 8/1960 | Manthey | 423/567 |
| 3,945,945 | 3/1976 | Kiovsky et al. | 252/463 |
| 4,534,855 | 8/1985 | Silverman | 208/253 |

FOREIGN PATENT DOCUMENTS

| | | | |
|---|---|---|---|
| 2734619 | 9/1978 | Germany | 423/578 |
| 2734619 | 2/1979 | Germany . | |
| 4311326 | 6/1994 | Germany | 423/578.1 |
| 44-5693 | 3/1969 | Japan | 423/578.1 |
| 6171909 | 6/1994 | Japan | 423/578.1 |
| 1502456 | 8/1989 | U.S.S.R. | 23/293 S |
| 140844 | 3/1920 | United Kingdom | 423/578.2 |

*Primary Examiner*—Gary P. Straub
*Assistant Examiner*—Timothy C. Vanoy
*Attorney, Agent, or Firm*—Frishauf, Holtz, Goodman, Langer & Chick, P.C.

[57] ABSTRACT

Mercury in trace amounts in sulfur that has been recovered from zinc concentrates by direct pressure leaching or other hydrometallurgical processes can be removed effectively by bringing the molten sulfur, as it is held at a temperature not lower than the melting point of sulfur, into contact with activated alumina by passage through a packed layer of activated alumina or a filter coated with activated alumina, or by mixing with activated alumina under stirring or by passage through a fluidized layer of activated alumina. The method is capable of reducing the mercury content to 1 ppm or less, whereby sulfur having a purity of at least 99.99% that is advantageous for use as a raw material in the production of sulfuric acid and in other industries is manufactured at low cost on simple equipment.

22 Claims, 2 Drawing Sheets

METHOD OF SULFUR PURIFICATION

This application is a continuation-in-part application of application Ser. No. 08/027,278 filed Mar. 5, 1993 now abandoned.

BACKGROUND OF THE INVENTION

This invention relates to a method of sulfur purification. More particularly, it relates to a method of enhancing the purity of sulfur by removing trace metal impurities such as mercury, copper, lead, zinc, iron and cadmium from the elemental sulfur which has been recovered by hydrometallurgical processes such as direct pressure leaching of zinc concentrates. Most particularly, this invention relates to a method of removing a trace amount of, or up to 100 ppm of mercury contained in sulfur, particularly elemental sulfur recovered by direct pressure leaching of zinc concentrates to such an extent that the mercury contact of the sulfur becomes 1 ppm or less.

Impurities in sulfur have conventionally been removed by various methods depending on the type of the impurities; solid impurities such as ashes are removed by precipitation or by filtration using filter aids, and other impurities such as hydrocarbons and tar are removed by adsorption on adsorbents such as diatomaceous earth, silica gel and activated carbon. However, for removal of metal impurities such as mercury, copper, lead, zinc, iron and cadmium that are contained in sulfur in trace amounts (less than a thousand ppm), those methods are not effective and techniques for enhanced removal such as distillation are required. Furthermore, when sulfur is to be used as a raw material for the production of sulfuric acid, the content of mercury in sulfur has to be lowered to 1 ppm or less and, to this end, a more effective method of mercury removal is necessary. This is because mercury is extremely harmful to the human body.

A direct pressure leaching system is drawing increasing attention as a new hydrometallurgical approach to process zinc concentrates. According to this system, the residue obtained by pressure leaching is subjected to flotation and elemental sulfur accompanied by unreacted sulfides is recovered as a float, which is melted at a temperature of 130°–150° C. and filtered, whereupon elemental sulfur is recovered in the filtrate. The sulfur recovered by this method contains metal impurities such as mercury, copper, lead, zinc, iron and cadmium that are each present in an amount of the order ranging from 10 to $10^2$ ppm. The sulfur from which such metal impurities have been removed has a purity of less than 99.99%, which is too low to impart market competitiveness to the sulfur for use as raw material in the production of sulfuric acid and in other industries. Hence, a strong need exists to develop a more effective method for removing metal impurities from the recovered sulfur. It is particularly important to remove mercury from the recovered sulfur, because mercury is very harmful to the human body and the recovered sulfur obtained in the pressure leaching of zinc concentrates is usually used as a raw material in the chemical industry, including the production of sulfuric acid and various other engineering and fine chemicals.

From the viewpoint of initial investment and energy cost, distillation and other conventional methods for enhanced removal of metal impurities are by no means considered to be effective in the case where sulfur is to be used as a raw material in the chemical industry including the production of sulfuric acid and various other engineering and fine chemicals.

SUMMARY OF THE INVENTION

The present invention has been accomplished under these circumstances and provides a method by which sulfur can be purified at low cost on simple equipment. According to the method, metal impurities such as mercury, copper, lead, zinc, iron and cadmium that are contained in trace amounts in sulfur, especially those metal impurities which are contained in the sulfur that has been recovered from zinc concentrates by direct pressure leaching thereof can be removed to such an extent that the sum of their contents in sulfur is 50 ppm or below, with the mercury content being 1 ppm or below, thereby yielding sulfur with a purity of at least 99.99% that is advantageous for use as a raw material in the production of sulfuric acid and in other industries.

The present invention provides a method by which metal impurities such as mercury, copper, lead, zinc, iron and cadmium that are contained in trace amounts in the sulfur that has been recovered by direct pressure leaching of zinc concentrates is removed with the aid of activated alumina which is an aluminum oxide. The metal impurities can be removed efficiently by bringing the sulfur into contact with the activated alumina as it is held at a temperature not lower than its melting point (119° C.), but preferably not higher than 159° C.

It has also been found that particularly for the purpose of eliminating mercury from sulfur, only limited types of activated alumina are effective.

In the course of repeated experiments of screening effective materials for use as an adsorbent on which mercury is to be adsorbed, the inventors have discovered that certain special types of activated alumina are effective for removing mercury from sulfur, although conventional types of activated alumina are not effective for the same purpose. Then, the inventors have found further that the effectiveness as an adsorbent for mercury depends on the types of crystal forms of activated alumina.

It is known that there are a number of various crystal forms of activated alumina inclusive of $\alpha$, $\theta$, $\gamma$, $\chi$, $\rho$ and $\eta$.

Most of the conventional activated alumina belong to $\alpha$-type or $\theta$-type crystal forms. These two types of activated alumina are not effective for the purpose of eliminating mercury from sulfur to a level of 1 ppm or less.

On the other hand, $\gamma$-activated alumina, $\chi$-activated alumina, $\rho$-activated alumina and $\eta$-activated alumina are almost equally effective when used as adsorbent on which mercury is adsorbed so that the mercury content of the treated sulfur may become 0.1 ppm or less. This is proved by the experimental data given hereinafter in Example 5.

The elemental sulfur which has been recovered from the process of direct pressure leaching of zinc concentrates usually contains from 10 to $10^2$ ppm of mercury. Thus, it is important that the specific four types of activated alumina ($\gamma$-activated alumina, $\chi$-activated alumina, $\rho$-activated alumina and $\eta$-activated alumina) be chosen for the purpose of purifying said elemental sulfur.

According to its first aspect, the present invention provides "a method of sulfur purification by removing metal impurities from molten sulfur by bringing it into contact with activated alumina".

According to its second aspect, the present invention provides "a method of sulfur purification by removing metal impurities from molten sulfur by causing it to pass through a packed layer of activated alumina so that it makes contact with said activated alumina".

According to its third aspect, the present invention provides "a method of sulfur purification by removing metal impurities from molten sulfur by causing it to pass through a filter coated with activated alumina so that it makes contact with said activated alumina."

According to its fourth aspect, the present invention provides "a method of sulfur purification by removing metal impurities from molten sulfur by mixing it with activated alumina under stirring so that it makes contact with said activated alumina".

According to its fifth aspect, the present invention provides "a method of sulfur purification by removing metal impurities from molten sulfur by causing it to pass through a fluidized layer of activated alumina so that it makes contact with said activated alumina".

DETAILED DESCRIPTION OF THE INVENTION

Figure 1:
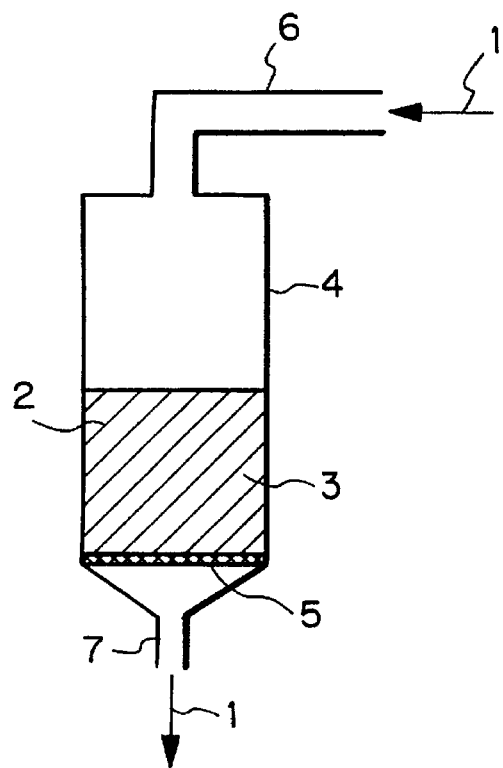
FIG. 1 is a diagram showing schematically a system in which molten sulfur is caused to pass through a packed layer of activated alumina according to the second aspect of the present invention.

The molten sulfur to be processed in the present invention is preferably held at a temperature not lower than the melting point of sulfur (119° C.), but more preferably at a temperature not higher than 159° C., within the range of 120°–150° C. ($\lambda$ sulfur) being particularly preferred. The activated alumina to be used in the present invention has preferably a specific surface area of 100–400 m$^2$/g, is of $\gamma$, $\chi$, $\rho$ or $\eta$ form having a particle size of up to 2 mm, preferably 100-10 µm, to insure a strong adsorbing capability. When sulfur to be purified is the one which contains 10 to 100 ppm of mercury such as the one obtained by direct pressure leaching of zinc concentrate, it is necessary to use specific types of activated alumina selected from the group consisting of $\gamma$-activated alumina, $\chi$-activated alumina, $\rho$-activated alumina and $\eta$-activated alumina, because mercury cannot be fully removed without using the above types of activated alumina.

Particularly, to insure that mercury as one of the metal impurities is removed to a content of 1 ppm or less, it is preferred to use activated alumina having a particle size of not larger than 100 µm.

Activated alumina is an aluminum oxide having such a strong adsorbing capability that it can remove the moisture or oil vapor content of gaseous materials and it is known that a saturated form of activated alumina can be reactivated by heating at 180°–320° C. so that the adsorbate is released. However, it was not known until the discovery by the present inventors as a result of intensive studies that activated alumina had the ability to remove metal impurieis (e.g. mercury, copper, lead, zinc, iron and cadmium) from molten sulfur by adsorption. It was not known, too, until the discovery by the present inventors as a result of intensive studies that only the specific types of activated alumina, represented by the $\gamma$-activated alumina, $\chi$-activated alumina, $\rho$-activated alumina and $\eta$-activated alumina are effective for the purpose of eliminating mercury from sulfur containing 10 to 10$^2$ ppm of mercury. The present invention has been accomplished on the basis of this finding.

The following four methods are available for insuring that molten sulfur containing trace amounts of metal impurities is brought into contact with the activated alumina described above, thereby initiating an adsorption reaction:

(1) the molten sulfur is caused to pass through a layer packed with the activated alumina (the second aspect of the invention);

(2) the molten sulfur is caused to pass through a filter coated with the activated alumina (the third aspect of the invention);

(3) the molten sulfur is mixed with the activated alumina under stirring (the fourth aspect of the invention); and (4) the molten sulfur is caused, to pass through a fluidized bed of the activated alumina (the fifth aspect of the invention).

These four methods are described below with reference to the accompanying drawings.

(1) FIG. 1 is a diagram showing schematically a system in which the molten sulfur indicated by 1 which is to be processed in accordance with the present invention is caused to pass through a layer packed with activated alumina. As shown in FIG. 1, the activated alumina indicated by 2 which has a particle size of not larger than 2 mm, preferably 100-10 µm is packed in a column 4 (120°–150° C.) in such a way, that the alumina particles are deposited on the surface of a filter ($\geq$250 mesh) to a height of 50–1,000 mm. The molten sulfur 1 as it is held at a temperature not lower than the melting point of sulfur, but preferably not higher than 159° C., within the range of 120°–150° C. being particularly preferred, is caused to pass through the column at a space velocity (SV) of not greater than 150 hr$^{-1}$, preferably 10-1 hr$^{-1}$, whereby the metal impurities in the sulfur 1 such as mercury, copper, lead, zinc, iron and cadmium are adsorbed on the activated alumina 2 and removed from the sulfur. When sulfur contains a substantial amount of mercury or in an amount in the order of 10 to 10$^2$ ppm, of $\gamma$-activated alumina, $\chi$-activated alumina, $\rho$-activated alumina and $\eta$-activated alumina should be used.

The molten sulfur is held at a temperature not lower than the melting point of sulfur, but preferably not higher than 159° C. (which is the upper limit of the temperature range above which the viscosity of the molten sulfur no more drops), more preferably at 120°–150° C., because it is within the temperature range over which the molten sulfur 1 has a feasible viscosity from the viewpoint of system design or handling of the sulfur. Outside this temperature range, the molten sulfur is so viscous that its fluidity decreases to cause inadequate contact with the activated alumina, thereby lowering the efficiency of reaction for removing the metal impurities.

The activated alumina 2 to be used in the present invention has preferably a particle size of not larger than 2 mm, more preferably in the range of 100-10 µm. As will be understood from Example 2 to be given later in this specification, activated alumina particles of 80–100 µm or less are preferred in order to insure that the mercury in the sulfur is removed to an amount of 1 ppm or less.

The column 4 may be formed of any material that is resistant to both heat and acid and which has a certain minimum strength; an example of such materials is SUS 316L. The activated alumina layer is packed in the column 4 to a height of 50–1,000 mm. Below 50 mm, the cross-sectional area of the column necessary to achieve a predetermined efficiency of removal is so large that, depending on the correlation with SV, (space velocity) a disadvantage will result from the viewpoint of equipment design. Above 1,000 mm, the resistance to fluid passage will increase so much that a predetermined SV cannot be attained, leading to a lower efficiency of removal.

In the practice of the present invention, SV is adjusted to 15 hr$^{-1}$ or below, preferably in the range of 10–1 hr$^{-1}$. As one can understand from Example 3 which is described later in this specification, SV larger than 15 hr$^{-1}$ causes only insufficient removal of metal impurities, particularly making it impossible for the residual mercury level to decrease to 1 ppm or less. On the other hand, if the SV is unduly small, the process time is prolonged to an extent that is disadvantageous from the viewpoint of equipment design. Hence, SV is preferably adjusted to be within the range of 10–1 hr$^{-1}$.

Consequently, in the second aspect of the present invention using the layer packed with activated alumina, the molten sulfur 1 is held at a temperature of 120°–150° C., the activated alumina 2 is conditioned to have a particle size of not larger than 100 μm, the height of the alumina layer in the column 4 is adjusted to 50–1,000 mm, and the passage of molten sulfur is performed at a SV of not greater than 15 hr$^{-1}$. With these conditions met, the metal impurities can be removed from sulfur while achieving the intended efficiency of removal.

Figure 2:
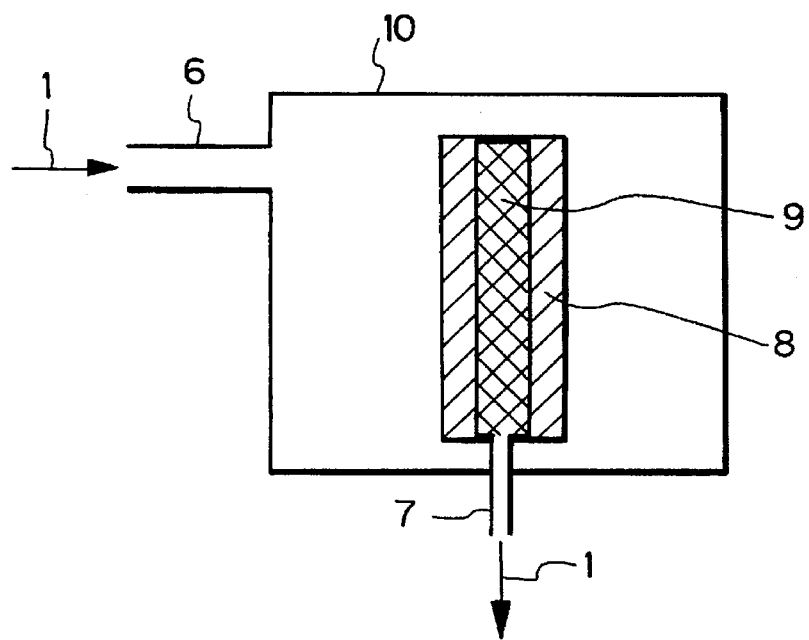
FIG. 2 is a diagram showing schematically a system in which molten sulfur is caused to pass through a filter coated with activated alumina according to the third aspect of the present invention.

(2) FIG. 2 is a diagram showing schematically a system in which the molten sulfur which is to be processed in accordance with the present invention is caused to pass through a filter coated with activated alumina. As shown in FIG. 2, the activated alumina indicated by 2 is coated on the surface of a filter plate 9 in a filter unit 10 to a thickness that is feasible from the viewpoint of system design or handling of the molten sulfur. The molten sulfur 1 as it is held within a certain temperature range is caused to pass through the coating of activated alumina 8, whereby the metal impurities in the molten sulfur 1 such as mercury, copper, lead, zinc, iron and cadmium are adsorbed on the activated alumina coating so that they are removed from the sulfur.

As in the case shown in FIG. 1, the molten sulfur 1 is held at a temperature not lower than the melting point of sulfur but not higher than 159° C., preferably in the range of 120°–150° C.; furthermore, the activated alumina 2 is conditioned to have particle size of not larger than 100 μm. The filter plate 9 is such that the openings are not coarser than 250 mesh; the activated alumina 2 is coated on the filter in a thickness of 20–30 mm to form an overlying coating of activated alumina, through which the molten sulfur 1 is allowed to pass.

The speed at which the molten sulfur 1 passes through the coating of activated alumina layer 8 is such that with the coating layer 8 being regarded as a packed layer, the SV is not greater than 15 hr$^{-1}$, preferably in the range of 10–1 hr$^{-1}$, as in the case already described above with reference to FIG. 1. The residence time of the molten sulfur 1 in the activated alumina coating will range from 4 to 60 minutes.

Thus, with the activated alumina 2 of a particle size not greater than 100 μm being coated on the filter 9 in a thickness of 20–30 mm, and if molten sulfur 1 which is held at a temperature in the range of 120°–150° C. is caused to pass through the filter unit as shown in FIG. 2 at a SV of 15-1 hr$^{-1}$ (for a residence time of 4–60 minutes within the alumina coating), the metal impurities can be removed from the sulfur while achieving the intended efficiency of removal. If the residence time within the alumina coating is shorter than 4 minutes, the metal impurities can be removed only insufficiently; if the residence time is longer than 60 minutes, the effectiveness of the present invention is saturated.

Figure 3:
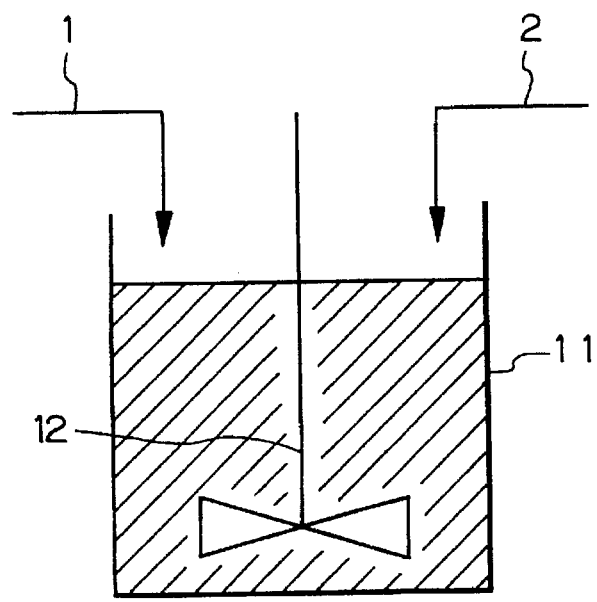
FIG. 3 is a diagram showing schematically a system in which molten sulfur is mixed with activated alumina under stirring according to the fourth aspect of the present invention.

(3) FIG. 8 is a diagram showing schematically a system in which the molten sulfur which is to be processed in accordance with the present invention is mixed with activated alumina under stirring. As shown in FIG. 3, the activated alumina 2 of the same nature as described under (1) and (2) is added to the molten sulfur 1 held within the temperature range set forth hereinabove and the two components are mixed together under stirring in a reaction vessel 11, whereby the metal impurities such as mercury, copper, lead, zinc, iron and cadmium are removed from the sulfur.

As in the cases shown in FIGS. 1 and 2, the molten sulfur 1 is held at a temperature not lower than the molting point of sulfur but not higher than 159° C., preferably in the range of 120°–150° C.; furthermore, the activated alumina 2 is conditioned to have a particle size of not larger than 100 μm and the interior of the reaction vessel 11 is maintained at a temperature within the range set forth above.

The concentration of the slurry (wt %) that is formed by mixing the molten sulfur 1 with the activated alumina 2 under stirring in the reaction vessel 11 and the period of time for which the stirring is effected are as will be described later in Example 4. In order to reduce the mercury content of sulfur to 1 ppm and below, the slurry concentration is preferably adjusted to 10–30 wt % and the stirring is preferably effected for 4–60 minutes. If the slurry concentration is less than 10 wt %, the metal impurities can be removed only insufficiently; beyond 30 wt %, the fluidity of the slurry will decrease so much as to lower the effectiveness of mixing and stirring operations. If the stirring period is less than 4 minutes, the metal impurities cannot be removed with the intended efficiency; if the stirring period exceeds 60 minutes, the efficiency of removal is saturated.

Thus, in the system shown in FIG. 3, the activated alumina 2 having a particle size of not larger than 100 μm is charged into the molten sulfur 1 at 120°–150° C. in such an amount as to give a slurry concentration of 10–30 wt % and the two components are mixed under stirring for 4–60 minutes with the temperature in the reaction vessel 11 maintained at 120°–150° C. With these conditions met, the metal impurities can be removed from the sulfur while achieving the intended efficiency of removal.

Figure 4:
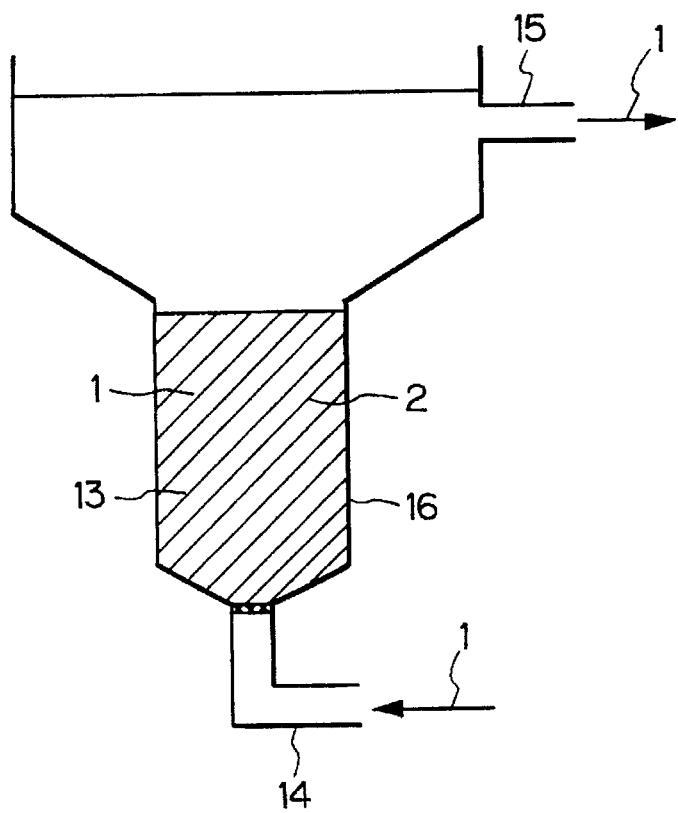
FIG. 4 is a diagram showing schematically a system in which molten sulfur is caused to pass through a fluidized layer of activated alumina according to the fifth aspect of the present invention.

(4) FIG. 4 is a diagram showing schematically a system in which the molten sulfur which is to be processed in accordance with the present invention is caused to pass through a fluidized layer of activated alumina. As shown in FIG. 4, the molten sulfur 1 which is held within the temperature range set forth under (1)–(3) is caused to pass upward at a flow rate close to the speed at which the activated alumina 2 settles in the molten sulfur 1 held within that temperature range (i.e., at a flow rate sufficient to maintain the fluidized state of the alumina 2), thus forming a fluidized layer 13 of the activated alumina 2 so that the molten sulfur 1 contacts the activated alumina 2 in a fluidized state, whereby the metal impurities such as mercury, copper, lead, zinc, iron and cadmium are removed from the sulfur.

The concentration of the slurry (wt %) being formed of the molten sulfur 1 and the activated alumina 2 within the fluidized layer 13 and the residence time of molten sulfur 1 within the fluidized layer 13 are such that, with the fluidized state being regarded as equivalent to an agitated state, the slurry concentration is at least 10 wt %, preferably 10–30 wt %, and the residence time (contact time) at least 4 min, preferably 6–60 minutes, as already described under (3).

Stated more specifically, a vessel for fluidization reaction that is indicated by 16 in FIG. 4 is filled with an activated alumina (true specific gravity: 3.2) having a particle size of not larger than 100 μm and molten sulfur 1 held at a temperature of 120°–150° C. is charged upward through a supply nozzle 14 at a flow rate of 0.2–2 m/hr so as to form such a fluidized layer that slurry concentration of alumina 2 in the molten sulfur 1 is within the range of 10–30 wt %, thereby permitting the molten sulfur 1 to contact the activated alumina for at least 4 minutes. With these conditions met, the metal impurities in the molten sulfur 1 can be removed to attain the intended result.

In the case shown above, the molten sulfur 1 is charged into the reactor at a flow rate of 0.2–2 m/hr; below 0.2 m/hr, a satisfactory fluidized state cannot be created; above, 2 m/hr, the fluidized state is destroyed and carryover of the activated alumina 2 will occur. The slurry concentration is adjusted to lie in the range of 10–30 wt % for the reason already set forth under (3).

The following examples are provided for the purpose of further illustrating the present invention but are in no way to be taken as limiting.

EXAMPLE 1

The activated alumina to be used in the present invention and two other adsorbents were subjected to a test for comparing their ability to remove metal impurities from molten sulfur.

The molten sulfur was recovered from a zinc concentrate by direct pressure leaching thereof. The activated alumina had a particle size of not larger than 100 μm. The other adsorbents were commercial grades of diatomaceous earth and activated carbon. Columns were packed respectively with the activated alumina, diatomaceous earth and activated carbon and the molten sulfur held at a temperature of 135° C. was passed through each column at a space velocity (SV) of 10 $hr^{-1}$. The results are shown in Table 1 below.

TABLE 1

|  | Metal impurity (ppm) | | | | | |
| --- | --- | --- | --- | --- | --- | --- |
|  | Hg | Cu | Pb | Zn | Fe | Cd |
| Molten sulfur before passage | 11 | 8 | 6 | 55 | 93 | 3 |
| Molten sulfur after passage | | | | | | |
| Activated alumina | 0.1 | Tr | Tr | 2 | 10 | Tr |
| Diatomaceous earth | 8 | 5 | 1 | 25 | 42 | 1 |
| Activated carbon | 7 | 4 | 2 | 37 | 51 | 1 |

As is clear from Table 1, only the activated alumina was capable of removing mercury from the molten sulfur to less than 1 ppm when it was passed through the column at a SV of 10 $hr^{-1}$. Diatomaceous earth and activated carbon were entirely ineffective in removing mercury.

EXAMPLE 2

In this example, a test was conducted to check the relationship between the particle size of the activated alumina to be used in the present invention and its ability to remove mercury from sulfur.

Five samples of activated alumina were provided; they had different particle sizes of 12 μm, 40–50 μm, 80–100 μm, 1–2 mm and 2–4 mm. Five units of column 4 were packed with these alumina samples to a height of 50 mm and molten sulfur with a mercury content of 11 ppm (as recovered from a zinc concentrate by direct pressure leaching) was passed through each column at space velocity (SV) of 1 $hr^{-1}$ as the sulfur was held at a temperature of 135° C. After passage through the columns, the mercury content of molten sulfur in each run was measured. The results are shown in Table 2.

TABLE 2

|  | Particle size of activated alumina | | | | |
| --- | --- | --- | --- | --- | --- |
|  | 12 μm | 40–50 μm | 80–100 μm | 1–2 mm | 2–4 mm |
| Hg content of molten sulfur after passage (ppm) | 0.1 | 0.1 | 0.1 | 1.1 | 2.0 |

As one can see from Table 2, activated alumina having particle sizes of up to 80–100 μm had to be used in order to remove mercury from the molten sulfur to less than 1 ppm. However, when the particle size of the activated alumina was unduly small, problems occurred such as the difficulty involved in separating the molten sulfur from the activated alumina after they had undergone reaction for Hg removal. Hence, it is preferred for the purposes of the present invention to adjust the particle size of activated alumina to lie within the range of 100-10 μm.

EXAMPLE 3

In this example, a test was conducted to check the relationship between the space velocity (SV) for the passage of molten sulfur through a packed layer of activated alumina and its ability to remove metal impurities from the sulfur.

The molten sulfur was recovered from a zinc concentrate by direct pressure leaching and the activated alumina had a particle size of not larger than 100 μm.

The activated alumina was packed in the column to a height of 50 mm and the molten sulfur held at a temperature of 135° C. was passed through the layer of activated alumina with the space velocity (SV) being varied at 1 $hr^{-1}$, 3 $hr^{-1}$, 5 $hr^{-1}$, 10 $hr^{-1}$ and 15 $hr^{-1}$. The molten sulfur that was passed in each run was sampled and the metal impurities in it were assayed. The results are shown in Table 3.

TABLE 3

|  | Metal impurity (ppm) | | | | | |
| --- | --- | --- | --- | --- | --- | --- |
|  | Hg | Cu | Pb | Zn | Fe | Cd |
| Molten sulfur before passage | 11 | 8 | 6 | 55 | 93 | 3 |
| Molten sulfur after passage | | | | | | |
| SV = 1 $hr^{-1}$ | 0.1 | Tr | Tr | 2 | 4 | Tr |
| SV = 3 $hr^{-1}$ | 0.1 | Tr | Tr | 2 | 9 | Tr |
| SV = 5 $hr^{-1}$ | 0.1 | Tr | Tr | 3 | 7 | Tr |
| SV = 10 $hr^{-1}$ | 0.1 | Tr | Tr | 2 | 10 | Tr |
| SV = 15 $hr^{-1}$ | 0.9 | 2 | 2 | 8 | 15 | Tr |

As one can see from Table 3, in order to insure that mercury in the molten sulfur could be positively removed to less than 1 ppm, the preferred SV was up to 10 $hr^{-1}$ when the activated alumina had a particle size of not larger than 100 μm.

EXAMPLE 4

In this example, a test was conducted to check the ability of activated alumina to remove mercury from molten sulfur versus the reaction time of mixing in a vessel and the slurry concentration of activated alumina. The molten sulfur was recovered by direct pressure leaching of a zinc concentrate and its mercury content was 9 ppm.

The activated alumina had a particle size of 40–50 μm. With the concentration of its slurry being varied at 0.1 wt %, 10 wt % and 30 wt %, the activated alumina was mixed with the molten sulfur under stirring for varying times of 6, 12, 20 and 60 min. After the reaction under stirring in each run, the mercury content of the molten sulfur was measured. In all runs, reaction was carried out at 138° C. The results are shown in Table 4.

TABLE 4

| Slurry concentration | Hg content of molten sulfur after passage (ppm) Reaction time (min) | | | |
|---|---|---|---|---|
| (wt %) | 6 | 12 | 20 | 60 |
| 0.1 | 7.6 | 7.6 | 7.6 | 8.4 |
| 10 | 0.2 | 0.2 | 0.3 | 0.1 |
| 30 | 0.1 | 0.1 | 0.1 | 0.1 |

As one can see from Table 4, the efficiency of removing mercury from the molten sulfur was much more influenced by the slurry concentration of activated alumina than the reaction time; when the slurry concentration was unduly low, only inefficient mercury removal could be accomplished. Preferably, the slurry concentration should be at least 10 wt %. However, when the slurry concentration exceeded 30 wt %, the efficiency of stirring the mixture dropped on account of increased viscosity and by other reasons, causing a tendency for the efficiency of mercury removal to decrease. Hence, the slurry concentration of activated alumina is preferably at least 10 wt %, with the range of 10–30 wt % being more preferred. The reaction time must be at least 4 minutes, preferably in the range of 6–60 min. If the reaction time is less than 4 minutes, only inefficient removal of mercury is accomplished; if the reaction time is longer than 60 min, the efficiency of removal is saturated.

EXAMPLE 5

Six different types of activated alumina (α, θ, γ, χ, ρ and η) were subjected to a test for comparing their ability to remove mercury from molten sulfur.

The molten sulfur was recovered from a zinc concentrate by direct pressure leaching thereof. The activated alumina had a particle size of not larger than 10 μm.

The following six different types of activated alumina were used.

(1) α-type crystal form activated alumina which was in a form almost free of crystal water and was obtained by calcining aluminum hydroxide at a temperature in the range of 1,000°–1,100° C.

This is one of the most popular types of activated alumina and is the one usually called simply by the name of "activated alumina".

(2) θ-type crystal form activated alumina which was in the form almost free of crystal water and was obtained by calcining aluminum hydroxide at a temperature in the range of 1,000°–1,100° C.

This is another one of the most popular types of activated alumina and is the another one usually called simply by the name of "activated alumina".

(3) γ-type crystal form of activated alumina which has some amount of crystal water. This is obtained by hydro-thermally treating aluminum hydroxide (crystal form=Norstrandite) at 200° C. followed by calcining at 550° C.

This is commercially available from Sumitomo Chemical Industries Co., Ltd. having the tradename of "SUMITOMOKAGAKU A-11".

(4) χ-type activated alumina which has some crystal water. This is obtained by calcining aluminum hydroxide (whose crystal form is gibbsite) at 300° C.

This type of activated alumina is commercially available from Sumitomo Chemical Industries Co., Ltd. having the tradenames of "SUMITOMOKAGAKUA-60" and "SUMITOMOKAGAKUA-35".

(5) ρ-type activated alumina which has some crystal water. This is obtained by calcining aluminum hydroxide (whose crystal form is one of Nostrandite, gibbsite, pyrorite and amorphous hydrate of a mixture thereof) in a vacuum at 300° C. This is commercially available from Sumitomo Chemical Industries Co., Ltd. having the tradename of "SUMITOMOKAGAKU BK-112".

(6) η-type activated alumina which has some crystal water. This is obtained by calcining aluminum hydroxide (crystal form=Norstrandite, pyrorite) at 250° C.

Columns were packed respectively with one of the above cited various activated alumina and the molten sulfur which were held at a temperature of 135° C. was passed through each column at a space velocity (SV) of 1 hr$^{-1}$. The results are shown in Table 5.

TABLE 5

| | Crystal form of activated alumina | | | | | |
|---|---|---|---|---|---|---|
| | α | θ | γ | χ | ρ | η |
| Hg content of molten sulfur before passage | 11 ppm | 11 ppm | 11 ppm | 11 ppm | 11 ppm | 11 ppm |
| Hg content of molten sulfur after passage | 8 ppm | 2 ppm | 0.1 ppm | 0.1 ppm | 0.1 ppm | 0.1 ppm |

As is clear from Table 5, only the special crystal forms of γ, χ, ρ and η type activated alumina were capable of removing mercury from the molten sulfur to less than 1 ppm when it was passed through the column at a SV of 1 hr$^{-1}$. α-activated alumina and θ-activated alumina were not sufficiently effective in removing mercury.

According to the present invention, metal impurities such as mercury, copper, lead, zinc, iron and cadmium that are contained in trace amounts in sulfur, especially those metal impurities which are contained in the sulfur that has been recovered from zinc concentrates by direct pressure leaching, are brought into contact with activated alumina as the sulfur is in molten state, thereby initiating an adsorptive reaction that causes the metal impurities to be removed to such amounts that the sum of their contents in sulfur is 50 ppm or below, with the mercury content being 1 ppm or below, thereby yielding sulfur with a purity of at least 99.99% that is advantageous for use as a raw material in the production of sulfuric acid and in other industries. Furthermore, the present invention enables the recovered sulfur to be processed to high purity at low cost on comparatively simple equipment.

What is claimed is:

1. A method of sulfur purification by lowering the mercury content thereof to 1 ppm or less, which comprises bringing molten sulfur into contact with a crystal form of activated alumina selected from the group consisting of γ-activated alumina, χ-activated alumina, ρ-activated alumina and η-activated alumina.

2. A method of sulfur purification comprising removing mercury from molten sulfur by causing the molten sulfur to pass through a packed layer of activated alumina so that the molten sulfur contacts said activated alumina, said activated alumina being selected from the group consisting of γ-activated alumina, χ-activated alumina, ρ-activated alumina and η-activated alumina.

3. The method according to claim 2 wherein said molten sulfur is passed through the packed layer of activated alumina at a space velocity of not greater than 15 hr$^{-1}$.

4. The method according to claims 2 wherein said molten sulfur is recovered from a process of direct pressure leaching of zinc concentrate.

5. The method according to claim 4 wherein said molten sulfur is maintained at a temperature not lower than the melting point of sulfur.

6. The method according to claim 4 wherein said molten sulfur is maintained at a temperature not higher than 159° C.

7. The method according to claim 4 wherein said activated alumina has a particle size of not greater than 2 mm.

8. The method according to claim 4 wherein said activated alumina has a particle size of 100 to 10 μm.

9. The method according to 2 wherein said molten sulfur is maintained at a temperature not lower than the melting point of sulfur.

10. The method according to claim 9 wherein said activated alumina has a particle size of not greater than 2 mm.

11. The method according to claim 9 wherein said activated alumina has a particle size of 100 to 10 μm.

12. The method according to claim 2 wherein said molten sulfur is maintained at a temperature not higher than 159° C.

13. The method according to claim 12 wherein said activated alumina has a particle size of not greater than 2 mm.

14. The method according to claim 12 wherein said activated alumina has a particle size of 100 to 10 μm.

15. The method according to claim 2 wherein said activated alumina has a particle size of not greater than 2 mm.

16. The method according to claim 2 wherein said activated alumina has a particle size of 100 to 10 μm.

17. A method of sulfur purification comprising removing mercury from molten sulfur by causing the molten sulfur to pass through a filter coated with activated alumina so that the molten sulfur contacts said activated alumina, said activated alumina being selected from the group consisting γ-activated alumina, χ-activated alumina, ρ-activated alumina and η-activated alumina.

18. The method according to claim 17 wherein said molten sulfur is passed through the coating of activated alumina at a space velocity of not greater than 15 hr$^{-1}$.

19. A method of sulfur purification comprising removing mercury from molten sulfur by mixing the molten sulfur with activated alumina under stirring so that the molten sulfur contacts said activated alumina, said activated alumina being selected from the group consisting of γ-activated alumina, χ-activated alumina, ρ-activated alumina and η-activated alumina.

20. The method according to claim 19 wherein the mixture of said molten sulfur and said activated alumina is a slurry having a concentration of 10–30 wt % and said molten sulfur and said activated alumina are held in contact with each other for a period of at least 4 minutes.

21. A method of sulfur purification comprising removing mercury from molten sulfur by causing the molten sulfur to pass through a fluidized layer of activated alumina so that the molten sulfur contacts said activated alumina, said activated alumina being selected from the group consisting of γ-activated alumina, χ-activated alumina, ρ-activated alumina and η-activated alumina.

22. The method according to claim 21 wherein a slurry formed from said fluidized layer of activated alumina has a concentration of 10–30 weight % and the activated alumina passes through said fluidized layer at a space velocity not greater than 15$^{-1}$.

* * * * *